United States Patent
Mallorey

(10) Patent No.: US 10,011,992 B2
(45) Date of Patent: Jul. 3, 2018

(54) POLYMERIC FOAM PRODUCT

(71) Applicant: Colorado Roofing Products, LLC, Aurora, CO (US)

(72) Inventor: Paul Mallorey, Arvada, CO (US)

(73) Assignee: Colorado Roofing Products, LLC, Aurora, CO (US)

( * ) Notice: Subject to any disclaimer, the term of this patent is extended or adjusted under 35 U.S.C. 154(b) by 0 days.

(21) Appl. No.: 15/016,876

(22) Filed: Feb. 5, 2016

(65) Prior Publication Data

US 2016/0229968 A1 Aug. 11, 2016

Related U.S. Application Data

(60) Provisional application No. 62/113,410, filed on Feb. 7, 2015.

(51) Int. Cl.
*C08J 9/00* (2006.01)
*E04D 1/22* (2006.01)
*E04D 1/20* (2006.01)

(52) U.S. Cl.
CPC .............. *E04D 1/22* (2013.01); *C08J 9/0066* (2013.01); *E04D 1/20* (2013.01); *C08J 2300/24* (2013.01); *C08J 2361/04* (2013.01); *C08J 2363/00* (2013.01); *C08J 2367/00* (2013.01); *C08J 2375/02* (2013.01); *C08J 2375/04* (2013.01); *C08J 2377/02* (2013.01)

(58) Field of Classification Search
CPC . C08J 9/0004; C08J 9/0066; C08J 9/04; C08J 2207/00; C08J 2367/00; C08J 2377/02; C08J 2375/02; C08J 2363/00; C08J 2371/10; C08J 2375/04; C08J 2300/24; C08J 2379/04; E04D 1/20; E04D 1/22
See application file for complete search history.

(56) References Cited

U.S. PATENT DOCUMENTS

| | | | | |
|---|---|---|---|---|
| 5,739,173 | A * | 4/1998 | Lutter | C08G 18/3851 521/100 |
| 6,046,247 | A * | 4/2000 | Gluck | C08G 18/4812 521/99 |
| 2005/0210789 | A1 | 9/2005 | Anghel | |
| 2005/0222361 | A1* | 10/2005 | Zaschke | C08G 18/4072 528/44 |
| 2009/0292032 | A1* | 11/2009 | Gupta | C08G 18/4018 521/85 |
| 2010/0080920 | A1 | 4/2010 | LaGrange et al. | |
| 2011/0155946 | A1* | 6/2011 | Simpson | B29C 44/352 252/62.54 |
| 2014/0013693 | A1* | 1/2014 | Zhou | B32B 5/16 52/408 |
| 2014/0272244 | A1 | 9/2014 | Harrington, Jr. et al. | |

* cited by examiner

*Primary Examiner* — John Cooney
(74) *Attorney, Agent, or Firm* — Reising Ethington P.C.; Matthew J. Schmidt

(57) ABSTRACT

In at least some implementations, a foam product includes 50% to 75% by weight thermoset, between 1% and 10% by weight colorant, between 1% and 3% by weight blowing agent, and one or more fire retardant additives embedded in the foam. Such a foam product may be used, for example, as a board, tile, shingle, shake, or other component for an interior or exterior portion of a residential or commercial structure. In the examples of shingles, shakes, tiles and the like, the foam product may be used on a roof or any other desired portion of a structure, and it may be used for decoration, protection and/or insulation of the structure.

13 Claims, 2 Drawing Sheets

POLYMERIC FOAM PRODUCT

REFERENCE TO COPENDING APPLICATION

This application claims the benefit of U.S. Provisional Patent Application Ser. No. 62/113,410 filed Feb. 7, 2015, which is incorporated herein by reference in its entirety.

TECHNICAL FIELD

The present disclosure is directed to polymeric foam products.

BACKGROUND

Wood shakes and roof shingles are conventionally made of cedar, redwood, or cypress, all of which are decay resistant. Roof shakes often provide an aesthetically pleasing shadow effect on the roof and nicely complement shake or other natural wood siding, in part due to the upper surface topography, and in part due to the taper that is unique to handsplit and resawn and tapersplit wood shakes.

However, compared with other commercially available roofing materials, wood shakes have numerous disadvantages. For example, wood shakes are not resistant to fire and some states have passed laws and/or implemented building codes that prohibit or restrict the use of wood shakes or shingles for roofing. Also, wood shakes are prone to expansion and contraction which must be accounted for during installation, may break when subjected to heavy loads, such as falling limbs or workmen, and may become brittle and friable near the end of their useful life.

Accordingly, a shake or shingle is desired that, among other things, is relatively light weight, strong, durable and fire resistant so that it meets existing codes with regard to fire retardation and otherwise includes adequate impact resistance, and strength.

SUMMARY

In at least some implementations, a foam product includes 50% to 75% by weight thermoset, between 1% and 10% by weight colorant, between 1% and 3% by weight blowing agent, and one or more fire retardant additives embedded in the foam. Such a foam product may be used, for example, as a board, tile, shingle, shake, or other component for an interior or exterior portion of a residential or commercial structure. In the examples of shingles, shakes, tiles and the like, the foam product may be used on a roof or any other desired portion of a structure, and it may be used for decoration, protection and/or insulation of the structure.

In at least some implementations, the thermoset includes one or more of polyurethane, polyisocyanurate, polyurea, polyester, polyphenol, polyexpoxide, or nylon 6, the colorant may include iron oxide, and/or the fire retardant additive includes expandable graphite that is capable of an at least 200:1 expansion in volume. The graphite may comprise about 2% to 10% by weight of the foam, in some examples, the graphite comprises about 3% to 6% by weight of the foam. In some implementations, the fire retardant additive may include one or more of graphite, anhydrous alumina, anhydrous borate or anhydrous phosphate.

BRIEF DESCRIPTION OF THE DRAWINGS

The following detailed description of preferred embodiments and best mode will be set forth with reference to the accompanying drawings, in which.

DETAILED DESCRIPTION OF PREFERRED EMBODIMENTS

Figure 1:
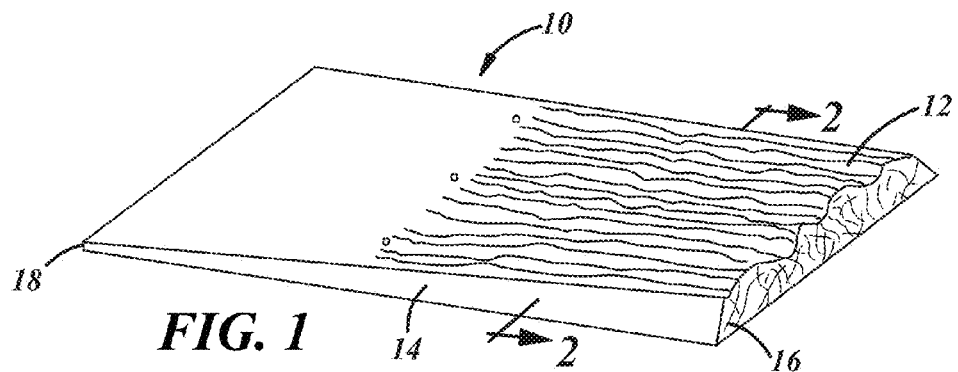
FIG. 1 is a perspective view of a polymeric product in the form of a roofing tile or shake.

Referring in more detail to the drawings, FIG. 1 illustrates a portion of a formed foam product 10 which may be used as a board, tile, shingle, shake, or other component for an interior or exterior portion of a residential or commercial structure. In the examples of shingles, shakes, tiles and the like, the foam product may be used on a roof or any other desired portion of a structure, and it may be used for decoration, protection and/or insulation of the structure, as desired. In at least some implementations, the product may have the appearance of cedar shakes, slate or similar products made from natural materials. The example product 10 shown in FIG. 1 is intended to simulate a cedar shake and has a textured upper surface 12 and a tapered profile 14 that is thicker at a lower end 16 than an upper end 18. When installed on a roof or other surface, the lower end 16 may be exposed/in view and the upper end 18 may be overlapped by one or more other shakes, other building product, or it may be exposed, as desired. Of course, this is just one representative configuration for the product 10 and this disclosure is not limited thereby.

The product 10 is formed from a polymeric material, and may be formed by a Reaction Injection Molding (RIM) process. Materials that may be used include any material suitable for a RIM process, such as, but not limited to, thermoset polymers like polyurethanes, polyisocyanurates, polyureas, polyesters, polyphenols, polyexpoxides, and nylon 6. Thus, the product 10 may be a relatively rigid foam.

In addition to the thermoset material(s), the product 10 may include one or more inert or reactive fillers, and/or other chemical or mineral components. Representative, but not limiting, components include iron oxide (e.g. for pigmentation), blowing agent(s), flame retardant(s) and inert fillers like aluminum trihydrate, calcium carbonate and the like. Flame retardants may include, but are not limited to, graphite 20 (FIGS. 2-5) and anhydrous alumina, anhydrous borate or anhydrous phosphate, or a blend of two or more of these. One or more of these flame retardant materials may be used in the same product, if desired. Representative compounds include aluminum trihydrate (ATH), magnesium hydroxide (MH), zinc borate (ZB), or ammonium polyphosphate (APP). These compounds are generally noted in FIG. 2 and identified by reference numeral 22. Upon heating these materials to temperatures between about 230 degrees F. and 400 degrees F., they release water molecules which improves flame retardation or suppression properties of the building product.

Figure 2:
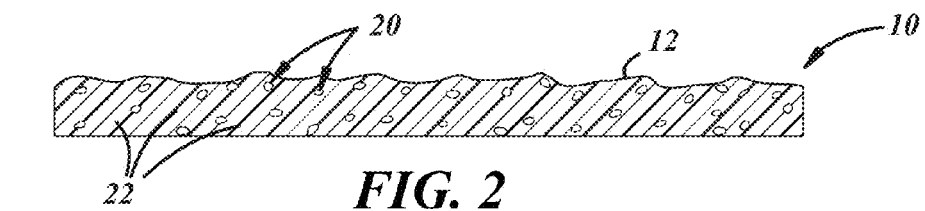
FIG. 2 is a diagrammatic sectional view of the product taken generally along line 2-2 of FIG. 1.
Figure 3:
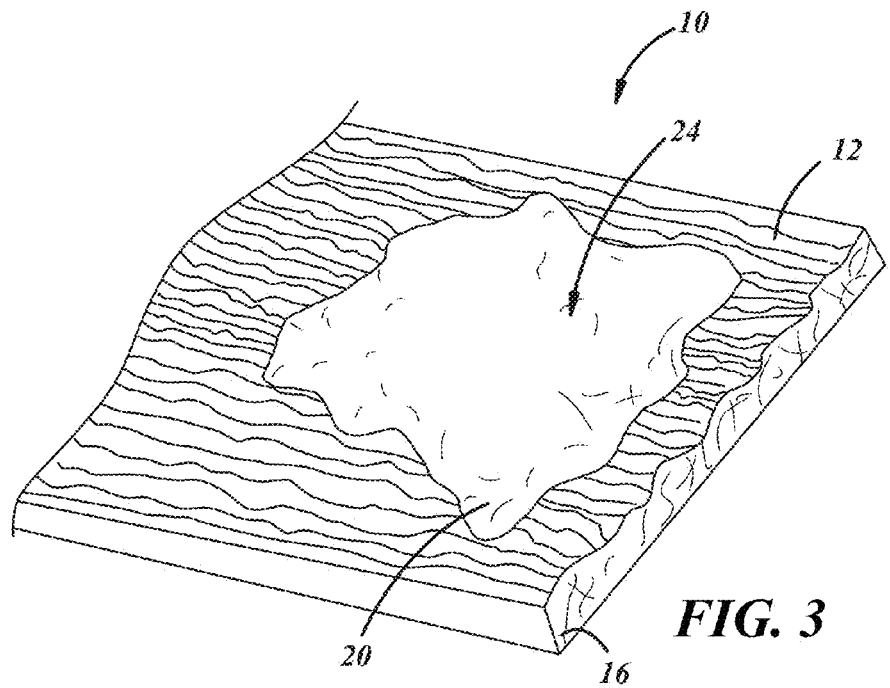
FIG. 3 is a fragmentary perspective view of the product showing an intumescent material forming a crust on the product.
Figure 4:
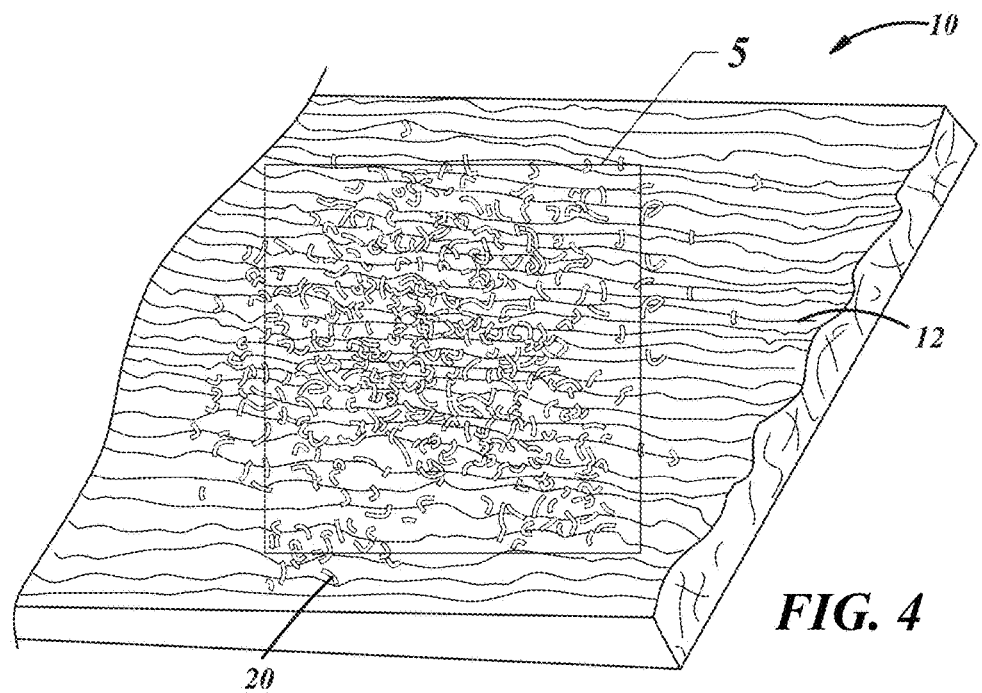
FIG. 4 is a fragmentary perspective view showing expandable graphite that has expanded through a surface of the product under localized heat and before burning of the graphite to form the crust shown in FIG. 3.
Figure 5:
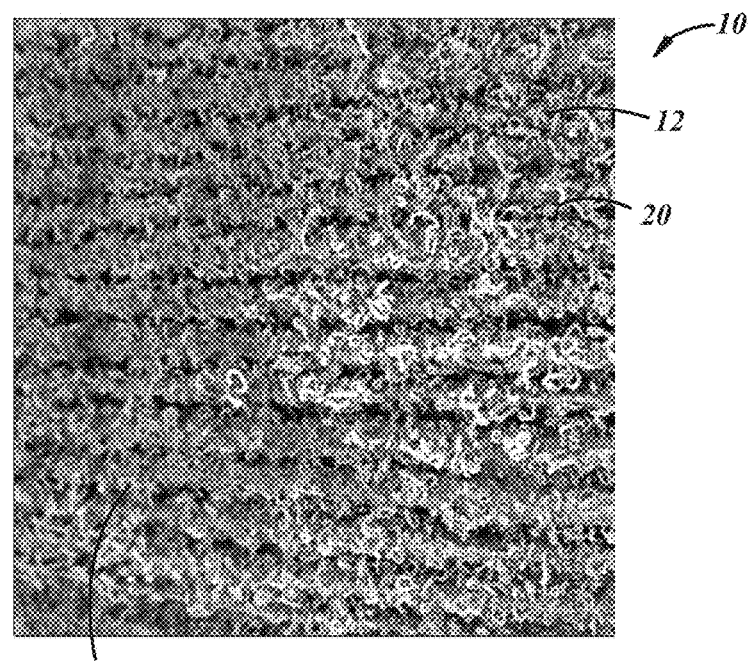
FIG. 5 is a fragmentary plan view showing expandable graphite that has burned to form a crust on the product.

The graphite 20 may be expandable or exfoliated graphite that expands when exposed to sufficient heat, as shown in FIGS. 3, 4 and 5. In at least certain implementations, the graphite may be capable of expanding by 200 times or greater from its original or pre-expansion size (e.g. its volume may increase by 200 times or more). The graphite may be embedded within the building product (e.g. as shown in FIG. 2) until the building product is exposed to sufficient heat to expand the graphite (e.g. as shown in FIGS. 3-5), such as in a fire. When sufficiently heated, the graphite will expand from within the building product and at least some of the graphite will protrude from and become exposed at a surface of the building product, as shown in FIG. 4. In this state, at least some of the graphite pieces or particles are partially embedded in the product and partially exposed at an outer surface of the product. The graphite in this state may be elongated, generally individual strands or pieces that may bend or curl during expansion. The graphite, when exposed to fire, will char and form an intumescent crust 24, as shown in FIGS. 3 and 5. By comparison of FIGS. 4 and 5, it can be seen that, in at least some implementations, upon further heating of the product, more pieces of graphite expand and become exposed from the outer surface of the product, and the pieces may expand to a greater extent. The graphite pieces may become overlapped and/or intertwined with each other so that when heated more or burned, a generally solid and continuous crust may form over at least a majority of the product, protecting the underlying product from the heat and or flame. In at least some implementations, less than 10% of the product's outer surface may be directly exposed after formation of the crust as generally shown in FIG. 5. The crust 24 inhibits or prevents flame propagation by protecting the underlying polymer matrix from the flame so that it does not burn (or further burn). In this way, the intumescent graphite acts as a flame suppressant or retardant.

In at least some implementations, the mixture used to form the foam product 10 may be comprised of, by weight: 50% to 75% thermoset material (e.g. polyurethane, polyisocyanurate, polyurea), between 1% and 10% pigments/colorant such as iron oxide, between 1% and 3% blowing agent, an effective amount of fire retardants, and, if desired, the remainder may include inert fillers. Any suitable blowing agent (e.g. low boiling point solvents like CFC, HCFC, freon, etc) may be used, and the product may be a water blown foam, if desired. The fillers may be provided simply to lower the cost of the mixture or to provide a desired property or characteristic, such as weather/UV resistance or increased strength. For example, glass fibers or mat may be added to reinforce or increase the strength of the formed foam product.

Some flame retardants, like ATH may also act or be used as a filler. ATH may be less expensive that polyurethane which may lower the overall product cost while also improving the flame retarding properties of the formed foam product 10. ATH may further have higher density that polyurethane so adding ATH in varying amounts to the mixture may affect the overall density of the formed foam product, which may in turn provide some structural improvement or improvement of some other desired characteristic of the product. In at least some implementations, ATH may comprise between 25% and 40% by weight of the mixture used to form the product 10. Of course, other fillers and/or flame retardants may be provided, and they may be provided in any suitable amount for a given application in which the product 10 will be used.

When graphite 20 is used as the flame retardant (either alone or in combination with any other flame retardant), the graphite may comprise between 2% and 10% of the mixture, by weight. In at least some implementations, it has been found that between 3% and 6% provides suitable fire retardation and avoids undesirable coloring of the product 10. Further, the graphite particles 20 should be large enough to avoid undesired coloring of the product—the smaller the graphite particles the more will be needed to provide the desired fire retardation properties, but more graphite particles present has a greater effect on product color. The graphite particles 20 also need to be small enough for processing in a RIM process. The graphite 20 may be dispersed within the foam product 10 as desired, and in at least some implementations is evenly distributed to enable graphite to expand out from all surfaces of the product to protect the underlying polymer from fire.

In at least some implementations, the foam product 10 formed as noted herein may have a density of between 15 and 35 pounds per cubic foot. In some applications, the product density may be between 18 and 22 pounds per cubic foot. The product 10 may withstand relatively severe impacts and bending forces, and will not burn or is resistant to burning. Products can be formed that meet or exceed desired standards for a given application. In the example of a roofing tile, shingle or shake, the product 10 may meet or exceed ASTM E-108 Class A fire rating, UL 2218 class 4 impact rating (resistance to impact from hail or other objects), and when installed can meet residential wind resistance requirements such as suitable wind resistance up to 145 mph. Hence, the product 10 may be relatively light weight yet strong, durable and fire resistant. Further, the product 10 may readily be provided in many shapes, sizes and colors, with smooth or textured surfaces, to meet different structural and aesthetic requirements.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A foam product, comprising:
50% to 75% thermoset by weight of a mixture from which the foam product is formed;
between 1% and 10% colorant by weight of the mixture;
between 1% and 3% blowing agent by weight of the mixture; and
one or more fire retardant additives embedded in the foam, wherein the one or more fire retardant additives include expandable graphite that is capable of an at least 200:1 expansion in volume and wherein the foam product has a density between 15 and 35 pounds per cubic foot and wherein the graphite comprises about 2% to 10% by weight of the mixture.

2. The product of claim 1 wherein the thermoset includes one or more of polyurethane, polyisocyanurate, polyurea, polyester, polyphenol, polyexpoxide, or nylon 6.

3. The product of claim 1 wherein the colorant includes iron oxide.

4. The product of claim 1 wherein the graphite comprises about 3% to 6% by weight of the mixture.

5. The product of claim 1 wherein the fire retardant additive includes one or more of anhydrous alumina, anhydrous borate or anhydrous phosphate.

6. A building product formed from the foam according to claim 1.

7. A board for a roofing tile, shingle or shake, comprising a foam product comprising:
50% to 75% by weight thermoset including one or more of polyurethane, polyisocyanurate, polyurea, polyester, polyphenol, polyexpoxide, or nylon 6 wherein the weight percent is of a mixture from which the foam product is formed;

between 1% and 10%, by weight of the mixture, colorant including at least some iron oxide;

between 1% and 3%, by weight of the mixture, blowing agent;

between 25% and 40%, by weight of the mixture, fire retardant other than expandable graphite; and expandable graphite embedded in the foam, wherein the expandable graphite is capable of an at least 200:1 expansion in volume and comprises about 3% to 6% by weight of the mixture.

8. The board of claim 7 wherein the foam has a density between 15 and 35 pounds per cubic foot.

9. The board of claim 7 wherein said fire retardant other than expandable graphite includes aluminum trihydrate.

10. The board of claim 8 wherein the foam meets or exceeds UL 2218 class 4 impact rating.

11. The foam product of claim 1 wherein the foam meets or exceeds UL 2218 class 4 impact rating.

12. A foam product for a roofing tile, shingle or shake, comprising:

50% to 75% polyurethane by weight of a mixture from which the foam product is formed;

between 1% and 10% colorant by weight of the mixture, wherein the colorant includes iron oxide;

between 1% and 3% blowing agent by weight of the mixture;

between 3% and 6% expandable graphite by the weight of the mixture, the expandable graphite being capable of an at least 200:1 expansion in volume; and between 25% and 40% fire retardant other than expandable graphite by weight of the mixture, wherein the foam product has a density between 15 and 35 pounds per cubic foot and the density and composition of the foam is such that the foam product meets or exceeds the requirements for an UL 2218 class 4 impact rating.

13. The foam product of claim 12 wherein the fire retardant other than expandable graphite includes aluminum trihydrate.

* * * * *